United States Patent [19]

Saito et al.

[11] Patent Number: 5,716,504
[45] Date of Patent: Feb. 10, 1998

[54] CATION EXCHANGE MEMBRANE FOR ELECTROLYSIS AND PROCESS FOR PRODUCING POTASSIUM HYDROXIDE OF HIGH PURITY

[75] Inventors: Yoshihiko Saito; Tetsuji Shimohira; Haruhisa Miyake, all of Yokohama, Japan

[73] Assignee: Asahi Glass Company Ltd., Tokyo, Japan

[21] Appl. No.: 666,213

[22] Filed: Jun. 20, 1996

[30] Foreign Application Priority Data

Jul. 10, 1995 [JP] Japan ............... 7-197998

[51] Int. Cl.[6] ............................... C25B 13/00
[52] U.S. Cl. ............ 204/296; 205/344; 205/508; 205/510; 205/512; 205/521; 521/27
[58] Field of Search ............... 521/27; 204/296; 205/344, 508, 510, 512, 521

[56] References Cited

U.S. PATENT DOCUMENTS

| | | | |
|---|---|---|---|
| 3,282,875 | 11/1966 | Connolly et al. | 260/29.6 |
| 3,909,378 | 9/1975 | Walmsley | 204/98 |
| 4,025,405 | 5/1977 | Dotson et al. | 204/296 |
| 4,253,923 | 3/1981 | Lynch et al. | 204/296 |
| 4,434,041 | 2/1984 | Kelley et al. | 205/512 |
| 4,586,992 | 5/1986 | Miyoke et al. | 205/512 |
| 5,004,648 | 4/1991 | Hane et al. | 428/364 |
| 5,039,382 | 8/1991 | Suzuki et al. | 204/296 |
| 5,149,403 | 9/1992 | Shimohira et al. | 204/296 |
| 5,264,090 | 11/1993 | Hiyoshi et al. | 204/296 |

OTHER PUBLICATIONS

Patent Abstracts of Japan, vol. 006, No. 177 (C-124), Sep. 11, 1982 & JP 57 092185 A (Asahi Chem Ind Co Ltd), Jun. 8, 1982, Abstract.

*Primary Examiner*—Bruce F. Bell
*Attorney, Agent, or Firm*—Oblon, Spivak, McClelland, Maier & Neustadt, P.C.

[57] ABSTRACT

A cation exchange membrane for electrolysis, which comprises at least 2 layers of fluorine-containing polymer films having sulfonic acid groups, wherein a first layer facing a cathode is made of a three component polymer of the following monomers (A), (B) and (C) and has a thickness of from 50 to 150 μm, and a second layer has a thickness of from 50 to 300 μm:

(A) $CF_2=CF(OCF_2CFCF_3)_mO(CF_2)_nSO_3M$ wherein m=0 or 1, n=1 to 5, and M is hydrogen or an alkali metal, (B) $CF_2=CF_2$, (C) $CF_2=CFO(CF_2CFO)_mRf$
$\qquad\qquad\qquad\ \ |$
$\qquad\qquad\qquad CF_3$ wherein m=0 or 1, and Rf is a $C_{1-10}$ perfluoroalkyl group.

7 Claims, No Drawings

CATION EXCHANGE MEMBRANE FOR ELECTROLYSIS AND PROCESS FOR PRODUCING POTASSIUM HYDROXIDE OF HIGH PURITY

The present invention relates to a fluorine-containing cation exchange membrane for electrolysis and a process for producing potassium hydroxide of high purity by hydrolyzing an aqueous potassium chloride solution using such a cation exchange membrane as a diaphragm.

A method for producing an alkali metal hydroxide and chlorine by electrolyzing an aqueous alkali metal chloride solution by means of an electrolytic cell having an anode compartment and a cathode compartment partitioned by a cation exchange membrane, has been developed and practically used as a method which is free from difficulties such as pollution problems, as compared with a mercury method and which is capable of producing potassium hydroxide of high purity at a high concentration with high efficiency, as compared with an asbestos diaphragm method. With respect to the cation exchange membranes to be used for this method, various developments and proposals have been made. One of such cation exchange membranes is a membrane wherein a sulfonic acid type membrane is used as the main layer. As such a cation exchange membrane, a membrane having the membrane surface subjected to reduction treatment and/or oxidation treatment to modify the surface with sulfonic acid groups to a carboxylic acid type thin layer, a membrane having a layer of weakly acidic groups such as carboxylic acid groups laminated on a main layer of a sulfonic acid type membrane, or a membrane having a thin layer of a low specific conductivity formed by a sulfonic acid type membrane of a specific structure, has, for example, been proposed.

Further, as a membrane wherein a carboxylic acid type membrane is used as the main layer, not only a membrane having the water content of a cation exchange membrane adjusted within a specific range but also a membrane of a multilayer structure with three layers i.e. a main layer of a carboxylic acid membrane, a sulfonic acid type membrane layer having a specific ion exchange capacity formed on one side thereof and a carboxylic acid type membrane layer formed on the other side (Japanese Unexamined Patent Publication No. 243129/1985), have been proposed. As a membrane particularly suitable for the production of potassium hydroxide, a membrane is known wherein a carboxylic acid type membrane having a specific ion exchange capacity is used as the main layer and a specific sulfonic acid type film is laminated on the anode compartment side of the main layer (Japanese Unexamined Patent Publication No. 251290/1985).

Further, the cation exchange membrane disclosed in Japanese Examined Patent Publication No. 1652/1987, is a fluorine-containing cation exchange membrane which comprises a first film of a fluorine-containing polymer having cation exchange groups and, laminated thereon, a second film made of a fluorine-containing polymer having the following repeating units (A), (B) and (C) and carboxylic acid groups as the ion exchange groups and having a high specific electrical resistance and a thickness of from 5 to 50 μm which is thinner than the first film:

$$-(CF_2-CXX')-\qquad (A)$$

$$\begin{array}{c}-(CF_2-CX)-\\|\\O-Rf\end{array}\qquad (B)$$

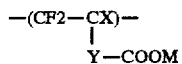

wherein each of X and X' is —F, —Cl or —CF$_3$, Rf is a C$_{1-10}$ perfluoroalkyl group, M is hydrogen or an alkali metal, Y is selected from —(CF$_2$)$_x$—, —O—(CF$_2$)$_x$—, —(O—CF$_2$—CFZ)$_x$—, and —(O—CFZ—CF$_2$)$_x$—O—(CFZ)$_y$—, wherein each of x and y is from 1 to 10, and Z is —F or Rf.

By using such a cation exchange membrane, electrolysis of an aqueous alkali metal chloride solution can be carried out at a high current efficiency.

According to the above mentioned Japanese Unexamined Patent Publication No. 251290/1985, it is possible to produce potassium hydroxide at a high current efficiency with low resistance by electrolyzing an aqueous potassium chloride solution by means of a cation exchange membrane comprising at least three layers wherein a main layer of a perfluorocarbon membrane having carboxylic acid groups as ion exchange groups and a surface layer of a perfluorocarbon polymer having sulfonic acid groups as ion exchange groups on the anode compartment side, are integrated with an interlayer of a perfluorocarbon polymer having both carboxylic acid groups and sulfonic acid groups, interposed therebetween.

However, as pointed out in such Japanese Unexamined Patent Publications No. 243129/1985 and No. 251290/1985, it is difficult to prevent leakage of potassium chloride from the anode compartment to the cathode compartment when it is intended to produce potassium hydroxide at a high concentration, and consequently, the purity of produced potassium hydroxide decreases. Thus, it has been difficult to produce potassium hydroxide of a high purity, particularly of a reagent grade where the concentration of potassium chloride is not higher than 5 ppm, at a high concentration with a high energy efficiency, by electrolysis of an aqueous potassium chloride solution by means of conventional ion exchange membranes.

In the present invention, further improvements have been made on such a fluorine-containing cation exchange membrane for electrolysis, and a process has been developed whereby potassium hydroxide of high purity containing little impurities from leakage, is produced by using this novel fluorine-containing cation exchange membrane for electrolysis of an aqueous potassium chloride solution.

Namely, it is an object of the present invention to provide a novel fluorine-containing cation exchange membrane useful for electrolysis and to provide a process for producing potassium hydroxide of high purity at a level of a reagent grade where the potassium chloride concentration in the potassium hydroxide is not higher than 5 ppm (in aqueous solution of 50 weight % potassium hydroxide) without an increase of the voltage, by the electrolysis employing such a membrane.

The novel and useful fluorine-containing cation exchange membrane presented by the present invention is useful not only for the electrolysis of an aqueous potassium chloride solution but also for electrolysis of water, an aqueous acidic or alkaline solution or an aqueous solution of other alkali metal halides, and an electrolyzed product can thereby be produced at a low electrolyzing voltage at a high current efficiency.

The present invention provides a cation exchange membrane for electrolysis, which comprises at least two layers of fluorine-containing polymer films having sulfonic acid groups, wherein a first layer facing a cathode is made of a three component polymer of the following monomers (A), (B) and (C) and has a thickness of from 50 to 150 µm, and a second layer has a thickness of from 50 to 300 µm:

(A) $CF_2=CF(OCF_2CFCF_3)_mO(CF_2)_nSO_3M$ wherein m=0 or 1, n=1 to 5, and M is hydrogen or an alkali metal, (B) $CF_2=CF_2$, (C) $CF_2=CFO(CF_2CFO)_mRf$
      $\quad\quad\quad\quad\quad\quad\;\;|$
      $\quad\quad\quad\quad\quad\;\;CF_3$ wherein m=0 or 1, and Rf is a $C_{1-10}$ perfluoroalkyl group.

Now, the present invention will be described in detail with reference to the preferred embodiments.

The fluorine-containing cation exchange membrane of the present invention provides excellent performance in electrolysis i.e. a high current efficiency, a low voltage for electrolysis and a performance to remarkably reduce the potassium chloride content in the potassium hydroxide produced in the cathode compartment, and at the same time, it has an excellent nature that the fluorine-containing polymer film of the first layer and the fluorine-containing polymer film of the second layer can readily be laminated by a simple method like roll press lamination. This is attributable to the fact that the first layer constituting the cation exchange membrane of the present invention is made of a fluorine-containing three component copolymer of the following monomers (A), (B) and (C).

Namely, a specific quantity of monomer (C) units are contained as a constituting element of the fluorine-containing three component copolymer used as the first layer, whereby the crystallinity of the polymer can be reduced even at a relatively low ion exchange capacity. Thus, the content of monomer (C) units, the molar ratio of C/(A+B+C), is preferably within a range of from 0.01 to 0.2, more preferably 0.02 to 0.1. Whereas, in the case of a two component copolymer composed solely of monomer (A) units and monomer (B) units without monomer (C) units, crystallinity is high at a low ion exchange capacity, whereby the film-forming property is very poor, and the adhesion to the second layer is poor, whereby blistering or peeling is likely to occur during use for electrolysis.

In the present invention, the fluorine-containing polymer film for the first layer is made of a three component copolymer of the following monomers (A), (B) and (C), as mentioned above:

(A) $CF_2=CF(OCF_2CFCF_3)_mO(CF_2)_nSO_3M$ wherein m=0 or 1, n=1 to 5, and M is hydrogen or an alkali metal, (B) $CF_2=CF_2$, (C) $CF_2=CFO(CF_2CFO)_mRf$
      $\quad\quad\quad\quad\quad\quad\;\;|$
      $\quad\quad\quad\quad\quad\;\;CF_3$ wherein m is 0=1, Rf is a $C_{1-10}$ perfluoroalkyl group.

As a preferred example, a three component copolymer of $CF_2=CFOCF_2CFCF_3O(CF_2)_{2-5}SO_3M$, $CF_2=CF_2$ and $CF_2=CFOCF_2CF_2CF_3$ may be mentioned. When such a three component copolymer film is used as the first layer, the film thickness of the first layer is preferably from 50 to 150 µm, more preferably from 60 to 100 µm, to maximize the ion exchange membrane performance. If the thickness is insufficient, the purity of potassium hydroxide thereby produced tends to be unstable, and if it is too much, the membrane resistance increases, such being undesirable. On the other hand, the fluorine-containing polymer film for the second layer is made of a two component copolymer of monomers (A) and (B) which are the same as in the above mentioned three component copolymer for the first layer. As a preferred example, a two component copolymer of $CF_2=CFOCF_2CFCF_3O(CF_2)_{2-5}SO_3M$ and $CF_2=CF_2$, may be mentioned. The thickness of such a second layer is preferably larger than the thickness of the first layer and is preferably from 50 to 300 µm, more preferably from 100 to 200 µm. If the thickness is small, the contribution of the second layer to the improvement of the toughness of the entire film will be small, such being undesirable. On the other hand, if it is large, the membrane resistance increases, such being undesirable.

The ion exchange capacity of the first layer which plays an important role in the present invention, is preferably from 0.5 to 1.0 meq/g dry resin, more preferably from 0.7 to 0.9 meq/g dry resin. If the ion exchange capacity is outside this range, such is disadvantageous from the viewpoint of preventing leakage of potassium chloride. On the other hand, for the second layer, so long as the mechanical strength is sufficient, it is preferred that the ion exchange capacity is large, and the specific electrical resistance is small. Namely, the ion exchange capacity of the second layer is adjusted to be larger than the first layer preferably by from 0.1 to 0.4 meq/g dry resin, more preferably by from 0.2 to 0.3 meq/g dry resin, and it is preferably selected within a range of from 0.6 to 1.4 meq/g dry resin, more preferably from 0.8 to 1.2 meq/g dry resin.

In the present invention, it is possible to further improve the performance, particularly to lower the resistance, by laminating a third layer made of the same kind fluorine-containing two component copolymer as for the second layer, on the anode side of the second layer. The fluorine-containing polymer film for the third layer preferably has a thickness of from 5 to 50 µm, more preferably from 10 to 30 µm. The ion exchange capacity is adjusted to be larger than the second layer preferably by from 0.1 to 0.4 meq/g dry resin, more preferably by from 0.2 to 0.3 meq/g dry resin, and it is selected preferably within a range of from 0.7 to 1.8 meq/dray resin, more preferably from 1.0 to 1.5 meq/g dry resin.

The above fluorine-containing polymer films for the first, second and third layers may be prepared by various conventional methods. Further, as a method for laminating and integrating such films, flat plate pressing or roll pressing may, for example, be mentioned. The pressing temperature for lamination is preferably from 60° to 280 °C., and the pressure is preferably within a range of from 0.1 to 100 kg/cm² in the case of the flat plate, or within a range of from 0.1 to 100 kg/cm in the case of roll pressing. Further, lamination of the films for the respective layers is preferably carried out in an appropriate form of ion exchange groups not to lead to decomposition of the ion exchange groups. For example, when the ion exchange groups are sulfonic acid groups, lamination is carried out preferably in the form of —SO₂F, which is later converted to —SO₃M wherein M is H or an alkali metal. Further, the total thickness of the ion exchange membrane after lamination is preferably from 100 to 450 µm, more preferably from 150 to 300 µm.

The fluorine-containing cation exchange membrane of the present invention may be reinforced with a woven fabric, a nonwoven fabric, fibrils or a porous body made of a fluorine-containing polymer such as polytetrafluoroethylene, or with a metal mesh, as the case requires. The fluorine-containing cation exchange membrane of the present invention exhibits excellent properties by itself. However, if necessary, it is possible to further improve the properties by forming a porous layer having a gas and liquid permeability and containing particles having electrode activities (U.S. Pat. No. 4,224,121) or a porous layer having a gas and liquid permeability and comprising particles having no electrode activities (Japanese Unexamined Patent Publication No. 33281/1994) on one side or each side of the membrane.

An electrolytic cell in which the fluorine-containing cation exchange membrane of the present invention is used, may be either a mono-polar type or a bi-polar type. With respect to the material constituting the electrolytic cell, for example, in the case of electrolysis of an aqueous potassium chloride solution, the one resistant to the aqueous potassium chloride solution and chlorine, such as valve metal or titanium, is used for the anode compartment, and the one resistant to potassium hydroxide and hydrogen, such as iron, stainless steel or nickel may, for example, be used for the cathode compartment. As the process conditions for electrolysis of the aqueous potassium chloride solution employing the fluorine-containing cation exchange membrane of the present invention, various conditions including conventional ones, may be employed. For example, electrolysis may be carried out preferably at a temperature of from 80° C. to 120° C. at a current density of from 10 to 100 A/cm$^2$ by supplying an aqueous potassium chloride solution preferably having a concentration of from 2.0 to 4.5 N to the anode compartment and supplying water or a dilute aqueous potassium hydroxide solution to the cathode compartment. In this case, it is advisable to minimize impurity ions such as calcium and magnesium in the aqueous potassium chloride solution, since such impurity ions tend to deteriorate the performance of the fluorine-containing ion exchange membrane. Further, in order to prevent generation of oxygen at the anode, an acid such as hydrochloric acid may be added to the aqueous potassium chloride solution.

By employing the above described fluorine-containing cation exchange membrane in the present invention, it is possible to attain a high current efficiency of at least 90% even at a high concentration of potassium hydroxide at a level of from 25 to 35%, and yet, it is possible to obtain potassium hydroxide of a high quality such that the content of potassium chloride as an impurity in the potassium hydroxide as the product is not more than 5 ppm (in 50 weight percent aqueous potassium hydroxide solution), with a low resistance. This may be explained as follows, but it should be understood that the present invention is by no means restricted by such an explanation. Namely, leakage of potassium chloride from the anode compartment to the cathode compartment in the production of potassium hydroxide of high purity, is believed to be attributable to the high water content of the layer of the cation exchange membrane facing the cathode. Accordingly, it is believed that leakage of potassium chloride ions into the cathode compartment is prevented by the presence of a layer having a low water content and specific sulfonic acid groups, as the layer facing the cathode.

Now, the present invention will be described in detail with reference to Examples. However, it should be understood that the present invention is by no means restricted by such specific examples.

EXAMPLE 1

Charged into a stainless steel pressure resistant reactor having an internal capacity of 10 ζ, were 2.86 kg of 1,3-dichloro-1,1,2,2,3-pentafluoropropane and 2.9 g of a,a'-azobisisobutyronitrile. Then, 3.72 kg of monomer (A),

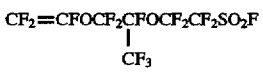

and 780 g of CF$_2$=CFOC$_3$F$_7$ (B) were charged thereinto. After sufficient deaeration, the temperature was raised to a polymerization temperature of 70° C., and the pressure was raised to a predetermined pressure of 11.2 kg/cm$^2$ by tetrafluoroethylene (C), to carry out the reaction. Polymerization was carried out while introducing tetrafluoroethylene, and the pressure was maintained at the predetermined pressure. Eight hours later, the reaction was terminated, and the obtained polymer was thoroughly washed and dried to obtain 3.1 kg of a three component copolymer having an ion exchange capacity of 0.82 meq/g dry resin and a molar ratio of C/(A+B+C) of 0.043. This three component copolymer will be identified with A.

Then, charged into the same reactor, were 2.57 kg of 1,3-dichloro-1,1,2,2,3-pentafluoropropane and 7.8 g of a,a'-azobisisobutyronitrile. Then, 3.40 kg of

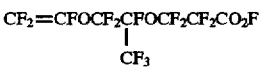

was charged thereto. After sufficient deaeration, the temperature was raised to a polymerization temperature of 70° C., and the pressure was raised to a predetermined pressure of 11.4 kg/cm$^2$ by tetrafluoroethylene, whereupon polymerization was carried out while introducing tetrafluoroethylene, and the pressure was maintained at the predetermined pressure.

Seven hours later, the reaction was terminated, and the obtained polymer was thoroughly washed and dried to obtain 3.0 kg of a copolymer having an ion exchange capacity of 0.91 meq/g dry resin. This two component copolymer will hereinafter be identified with B. The three component copolymer A was formed into a film having a thickness of 80 μm by extrusion at a temperature of 220° C. (hereinafter sometimes referred to as film A). Then, the two component copolymer B was formed into a film having a thickness of 120 μm (hereinafter sometimes referred to as film B) by extrusion at a temperature of 220° C. The three component copolymer film A and the two component copolymer film B were laminated by means of a roll at a temperature of 220° C. to obtain a double layer membrane, which was then immersed in an aqueous solution containing 30 wt % of dimethylsulfoxide and 15 wt % of potassium hydrochloride and then in water to obtain a fluorine-containing cation exchange membrane.

Then, the fluorine-containing cation exchange membrane thus obtained was installed in an electrolytic cell so that the film A faced the cathode, and electrolysis of an aqueous potassium chloride solution was carried out as follows. As the electrolytic cell, the one having an effective membrane area of 0.25 dm$^2$, an anode made of a RuO$_2$-coated Ti expanded metal and a cathode made of an active nickel-coated Fe expanded metal, with electrodes distance of 3 mm, was used, and electrolysis was carried out at a temperature of 90° C. at a current density of 30 A/dm$^2$ while supplying an aqueous potassium chloride solution of 180 g/ζ and water to the anode compartment and the cathode compartment, respectively, while maintaining the potassium hydroxide concentration in the cathode compartment at a level of 32 wt %. As a result, the current efficiency was 97.0%, and the voltage was 3.35 V. The potassium chloride content in the formed potassium hydroxide solution was 4 ppm. The electrolysis was continued for 30 days, whereupon the membrane was inspected, whereby no abnormality was observed.

EXAMPLE 2

In the same manner as described in Example 1, a two component copolymer C of

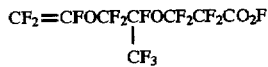

and $CF_2=CF_2$, having an ion exchange capacity of 1.10 meq/g dry resin, was obtained. Then, this two component copolymer C was formed into a film having a thickness of 30 μm (hereinafter sometimes referred to as film C) by extrusion at a temperature of 220° C. Using films A and B as used in Example 1 and film C as a third layer, these films A, B and C were laminated in this order by means of a roll in the same manner as in Example 1 to obtain a three layer membrane. The cation exchange membrane thus obtained was hydrolyzed under the same conditions as disclosed in Example 1 and then installed in an electrolytic cell so that film A faced the cathode, whereupon electrolysis was carried out under the same conditions as described in Example 1. As a result, the current efficiency was 97.2%, and the voltage was 3.15%. The potassium chloride content in the formed potassium hydroxide solution was 4 ppm. The electrolysis was continued for 150 days, whereupon the membrane was inspected, whereby no abnormality was observed.

COMPARATIVE EXAMPLE 1

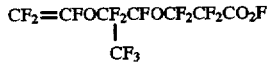

and $CF_2=CF_2$ were copolymerized to obtain a two component copolymer having an ion exchange capacity of 0.82 meq/g dry resin. This copolymer was formed into a film having a thickness of 80 μm by extrusion. This film will hereinafter be identified with D. Then, the film D and the film B as used in Example 1 were laminated at a temperature of 220° C. by no means of a roll in the same manner as in Example 1 to obtain a cation exchange membrane. Using this cation exchange membrane, electrolysis of an aqueous potassium chloride solution was carried out in the same manner as in Example 1, whereby the current efficiency was 97%. However, the voltage gradually increased. Therefore, the cell was disassembled, and the membrane was inspected, whereby partial blistering at the interface of the laminated layers was observed after the electrolysis for 15 days.

COMPARATIVE EXAMPLE 2

Charged into a stainless steel pressure resistant reactor having an internal capacity of 10 ζ, were 6.500 g of deionized water, 13 g of $C_8F_{17}COONH_4$, 32.5 g of $Na_2HPO_4.12H_2O$, 19.5 g of $NaH_2PO_4.2H_2O$ and 1.7 g of $(NH_4)_2S_2O_8$. Then, 1,300 g of $CF_2=CFO(CF_2)_3COOCH_3$ were charged thereinto. After sufficient deaeration, the temperature was raised to a polymerization temperature of 75° C., and tetrafluoroethylene was introduced to a pressure of 11.0 kg/cm², to carry out the reaction. 4.5 hours later, the reaction was completed, and the obtained polymer was thoroughly washed and dried to obtain 1,520 g of a two component copolymer having an ion exchange capacity of 1.44 meq/g dry resin. Then, 2.7% of polytetrafluoroethylene (PTFE) particles were added thereto, and the mixture was formed into a film having a thickness of 260 μm by extrusion at a temperature of 230° C.

Then, charged into the same reactor, were 6,500 g of deionized water, 1.3 g of $C_8F_{17}COONH_4$, 32.5 g of $Na_2HPO_4.12H_2O$, 19.5 g of $NaH_2PO_4.2H_2O$, 1.7 g of $(NH_4)_2S_2O_8$ and 0.46 g of isopropanol. Then, 845 g of $CF_2=CFO(CF_2)_3COOCH_3$ and 450 g of $CF_2=CFOC_3F_7$ were charged thereto. After sufficient deaeration, the temperature was raised to a polymerization temperature of 57° C. and tetrafluoroethylene was introduced to a pressure of 12.4 kg/cm², to carry out the reaction. 4.5 hours later, the reaction was terminated, and the obtained polymer was thoroughly washed and dried to obtain 1,290 g of a three component copolymer having an ion exchange capacity of 0.86 meq/g. This three component copolymer was formed into a film having a thickness of 20 μm by extrusion at a temperature of 230° C.

Then, the two types of films obtained above, were laminated by means of a roll at 230° C. to obtain a double layer membrane, which was then hydrolyzed with a 12 wt % potassium hydroxide aqueous solution. By using the membrane having carboxylic acid groups as ion exchange groups, thus obtained, electrolysis of an aqueous potassium chloride solution was carried out in the same manner as in Example 1, whereby the current efficiency was 95%. However, the potassium chloride content in the produced potassium hydroxide solution was 20 ppm (calculated as 50%). The electrolysis was continued for 150 days, whereupon the membrane was inspected, whereby no abnormality was observed. The membrane of this Comparative Example 2 was produced in accordance with the aforementioned Japanese Examined Patent Publication No. 1652/1987. It is evident that a further improvement has been made by the present invention with respect to the potassium chloride content in the produced potassium hydroxide solution.

As described in the foregoing, the present invention provides a novel fluorine-containing cation exchange membrane having a high performance, which is useful for electrolysis of various materials such as water, an acid, an alkali or an alkali metal chloride aqueous solution. Further, it is possible to produce potassium hydroxide of high purity at a level of a reagent grade where the content of potassium chloride as an impurity is not more than 5 ppm, at a high energy efficiency, by electrolysis of an aqueous potassium chloride solution employing such a cation exchange membrane. Further, the fluorine-containing cation exchange membrane is free from blistering or peeling during its use.

What is claimed is:

1. A cation exchange membrane for electrolysis, which comprises at least two layers of fluorine-containing polymer films having sulfonic acid groups, wherein a first layer facing a cathode is made of a three component polymer of the following monomers (A), (B) and (C) and has a thickness of from 50 to 150 μm, and a second layer is made of a two component polymer of monomers (A) and (B) and has a thickness of from 50 to 300 μm:

(A) $CF_2=CF(OCF_2CFCF_3)_mO(CF_2)_nSO_3M$ wherein m=0 or 1, n=1 to 5, and M is hydrogen or an alkali metal.

(B) $CF_2=CF_2$, (C) $CF_2=CFO(CF_2CFO)_mRf$
$\phantom{(C) CF_2=CFO(CF_2}|$
$\phantom{(C) CF_2=CFO(CF_2}CF_3$ wherein m=0 or 1, and Rf is a $C_{1-10}$ perfluoroalkyl group.

2. The cation exchange membrane for electrolysis according to claim 1, wherein the first layer has an ion exchange capacity of from 0.5 to 1.0 meq/g dry resin, the second layer has an ion exchange capacity of from 0.6 to 1.4 meq/g dry resin, and the ion exchange capacity of the second layer is larger than that of the first layer.

3. The cation exchange membrane for electrolysis according to claim 1, wherein the molar ratio of C/(A+B+C) is within a range of from 0.01 to 0.2.

4. The cation exchange membrane for electrolysis according to claim 1, which has a third layer made of a fluorine-containing polymer film having sulfonic acid groups and having an ion exchange capacity of from 0.7 to 1.8 meq/g dry resin which is larger than the ion exchange capacity of the second layer, on the anode side of the second layer.

5. A process for producing potassium hydroxide of high purity, which comprises supplying an aqueous potassium chloride solution to an anode compartment of an electrolytic cell having the anode compartment and a cathode compartment partitioned by a cation exchange membrane, and electrolyzing it to form potassium hydroxide in the cathode compartment, wherein a cation exchange membrane defined in claim 1 is used as the above cation exchange membrane.

6. The process for producing potassium hydroxide of high purity according to claim 5, wherein the electrolysis is carried out at a concentration of the aqueous potassium chloride solution of from 2.0 to 4.5 N and at a concentration of the aqueous potassium hydroxide solution of from 20 to 40 wt %.

7. The process for producing potassium hydroxide of high purity according to claim 5, wherein the content of potassium chloride in the potassium hydroxide produced is not more than 5 ppm in the 50 weight percent aqueous solution.

* * * * *

UNITED STATES PATENT AND TRADEMARK OFFICE
CERTIFICATE OF CORRECTION

PATENT NO. : 5,716,504
DATED : February 10, 1998
INVENTOR(S) : Yoshihiko SAITO, et al It is certified that error appears in the above-identified patent and that said Letters Patent is hereby corrected as shown below:

Column 6, line 7, "$CF_2=CFOC_3F_7(B)$" should read --$CF_2CFOC_3F_7(C)$--.

Column 6, line 11, "tetrafluoroethylene (C)" should read --tetrafluoroethylene (B)--.

Column 6, lines 24 & 25, "$CF_2=CFOCF_2CFOCF_2CF_2CO_2F$" should read --$CF_2=CFOCF_2CFOCF_2CF_2SO_2F$--.

Column 7, lines 10 & 11, "$CF_2=CFOCF_2CFOCF_2CF_2CO_2F$" should read --$CF_2=CFOCF_2CFOCF_2CF_2SO_2F$--.

Column 7, lines 35 & 36 "$CF_2=CFOCF_2CFOCF_2CF_2CO_2F$" should read --$CF_2=CFOCF_2CFOCF_2CF_2SO_2F$--.

Column 7, line 29, "3.15%" should read --3.15V--.

Column 5, line 67, "$\zeta$" should read --$\ell$--.

UNITED STATES PATENT AND TRADEMARK OFFICE
CERTIFICATE OF CORRECTION

PATENT NO. :  5,716,504                                     Page 2 of 2
DATED      :  February 10, 1998
INVENTOR(S):  Yoshihiko SAITO, et al It is certified that error appears in the above-identified patent and that said Letters Patent is hereby corrected as shown below:

Column 6, line 63, "$\zeta$" should read --$\ell$--.

Column 7, line 58, "$\zeta$" should read --$\ell$--.

Signed and Sealed this

Twenty-eighth Day of November, 2000

Attest:

Q. TODD DICKINSON

*Attesting Officer*               *Director of Patents and Trademarks*